United States Patent
Nebel et al.

(10) Patent No.: US 8,806,773 B2
(45) Date of Patent: Aug. 19, 2014

(54) METHOD OF FOLDING AN AIRBAG, AND DEVICE FOR FOLDING THE AIRBAG

(75) Inventors: Raimund Nebel, Obermeitingen (DE); Oliver Adolph, München (DE); Jürgen Mackensen, Dachau (DE)

(73) Assignee: Autoliv Development AB, Vårgårda (SE)

( * ) Notice: Subject to any disclaimer, the term of this patent is extended or adjusted under 35 U.S.C. 154(b) by 256 days.

(21) Appl. No.: 13/380,336

(22) PCT Filed: Jul. 14, 2010

(86) PCT No.: PCT/EP2010/004289
§ 371 (c)(1),
(2), (4) Date: Dec. 22, 2011

(87) PCT Pub. No.: WO2011/006647
PCT Pub. Date: Jan. 20, 2011

(65) Prior Publication Data
US 2012/0096735 A1    Apr. 26, 2012

(30) Foreign Application Priority Data
Jul. 16, 2009   (DE) .................... 10 2009 033 561

(51) Int. Cl.
*F26B 3/00*       (2006.01)
*B60R 21/237*   (2006.01)

(52) U.S. Cl.
CPC ....... *B60R 21/237* (2013.01); *B60R 2021/2375* (2013.01)
USPC .......... 34/357; 34/418; 34/68; 34/90; 53/510; 280/728.2; 280/728.3; 15/316.1

(58) Field of Classification Search
USPC ............... 34/357, 380, 381, 418, 500, 68, 90; 53/11 R, 520; 280/732, 728.3, 728.2; 15/312.1, 316.1, 405
See application file for complete search history.

(56) References Cited

U.S. PATENT DOCUMENTS

| | | | | |
|---|---|---|---|---|
| 4,418,442 A | * | 12/1983 | Day et al. ..................... | 15/312.2 |
| 5,203,586 A | * | 4/1993 | Niwa et al. .................. | 280/728.3 |
| 5,288,103 A | * | 2/1994 | Parker et al. ............... | 280/728.3 |
| 5,421,608 A | * | 6/1995 | Parker et al. ............... | 280/728.3 |
| 5,791,077 A | * | 8/1998 | Felber ........................... | 40/610 |

(Continued)

FOREIGN PATENT DOCUMENTS

| | | |
|---|---|---|
| DE | 195 35 564 A1 | 3/1997 |
| DE | 198 45 721 A1 | 4/2000 |

(Continued)

OTHER PUBLICATIONS

Patent Abstracts of Japan or machine translation of JP11240402.*

(Continued)

*Primary Examiner* — Steve M Gravini
(74) *Attorney, Agent, or Firm* — Brinks Gilson & Lione

(57) ABSTRACT

Disclosed is a method for folding an airbag (1) for placement in an airbag module for a motor vehicle. The method involves folding the airbag (1), exposing the airbag (1) to moisture, compressing the airbag (1), and simultaneously extracting the moisture. Moisture in liquid or vapor form can be introduced before or after folding the airbag. Further disclosed is a device for folding the airbag.

10 Claims, 1 Drawing Sheet

(56) References Cited

U.S. PATENT DOCUMENTS

| | | | |
|---|---|---|---|
| 5,797,619 A * | 8/1998 | Bauer et al. | 280/728.3 |
| 5,901,461 A * | 5/1999 | McElroy et al. | 34/233 |
| 6,186,857 B1 * | 2/2001 | Gazit et al. | 446/226 |
| 6,497,389 B1 * | 12/2002 | Rawdon et al. | 244/138 R |
| 6,753,057 B1 * | 6/2004 | Gardner, Jr. | 428/43 |
| 7,040,653 B1 * | 5/2006 | Breed | 280/731 |
| 7,216,396 B2 * | 5/2007 | Slawinski | 15/301 |
| 7,338,069 B2 * | 3/2008 | Breed | 280/729 |
| 7,481,453 B2 * | 1/2009 | Breed | 280/738 |
| 7,744,122 B2 * | 6/2010 | Breed | 280/731 |
| 2003/0042718 A1 * | 3/2003 | Katsuda et al. | 280/736 |
| 2004/0164531 A1 * | 8/2004 | Riha et al. | 280/732 |
| 2006/0261579 A1 * | 11/2006 | Breed | 280/729 |
| 2010/0320737 A1 * | 12/2010 | Matsunaga et al. | 280/743.1 |
| 2011/0133522 A1 * | 6/2011 | Kring et al. | 296/214 |
| 2012/0096735 A1 * | 4/2012 | Nebel et al. | 34/357 |
| 2012/0305371 A1 * | 12/2012 | Chevalier et al. | 200/61.54 |

FOREIGN PATENT DOCUMENTS

| | | |
|---|---|---|
| EP | 0 712 761 A1 | 5/1996 |
| EP | 0 850 160 A1 | 7/1998 |
| EP | 1 031 473 A2 | 8/2000 |
| EP | 1 127 752 B1 | 10/2004 |
| JP | 111240402 A | 9/1999 |
| WO | WO 2011/006647 A1 | 1/2011 |

OTHER PUBLICATIONS

Confirmation Reciept: Translation Request 13380336 (Doc# JP 11210402) dated Feb. 15, 2014 ( 2 pages).*
German Search Report—Mar. 19, 2010.
PCT International Search Report—Oct. 15, 2010.

* cited by examiner

METHOD OF FOLDING AN AIRBAG, AND DEVICE FOR FOLDING THE AIRBAG

CROSS REFERENCE TO RELATED APPLICATIONS

This application claims priority to German Patent Application No. 102009033561.7, filed Jul. 16, 2009, and PCT International Patent Application No. PCT/EP2010/004289, filed Jul. 14, 2010.

TECHNICAL FIELD OF THE INVENTION

The invention relates to a method for folding an airbag for an airbag module for a motor vehicleand a device for folding an airbag.

BACKGROUND OF THE INVENTION

In airbag modules, an airbag is generally placed in a housing, into which it is directly folded. After having been folded, the airbag needs to be permanently fixed because otherwise it would unfold again prior to the attachment of the housing cover.

Another method provides for the airbag to be folded first and then to be prefixed by a suitable textile strap. The prefixed airbag can then be placed in the housing without the risk of unfolding again during the assembly of the airbag module. However, it is a disadvantage of this method that the airbag afterwards may again unfold to the outside between the textile straps unless it is completely enveloped by the textile straps, which in turn would be very expensive.

From EP 1 127 752 B1, a method is known in which the airbag is folded first, then heated and then compressed at the same time being cooled down. Due to the airbag being compressed while being cooled down, the folding of the airbag is supposed to hold up subsequently for a certain period of time without the need for a separate fixation. However, it is a disadvantage of this method that the folding just remains for a limited period of time within which the folded airbag needs to be placed in the airbag module.

It is an object of the invention to provide a method for folding an airbag enabling an improved shape retention of the folded airbag. It further is an object of the invention to provide an airbag module comprising an airbag, which airbag module shall be more cost-effective to produce. Moreover, it is an object of the invention to provide a device by which the folding of the airbag may be improved in so far as the airbag, after having been folded, shows an enhanced shape retention.

SUMMARY OF THE INVENTION

The present invention provides a method involving the steps of folding the airbag, exposing the airbag to moisture, and compressing the airbag while causing a simultaneous escape of moisture.

The moisture introduced into the airbag effects a moistening of the airbag which, after having been compressed and after the moisture having escaped, then much better retains its shape predefined by the compressing operation than this would be the case without moisture. A similar effect occurs for example with a steam iron in which the textile is exposed to steam which is then extracted from the textile again by the latter being heated via the hot ironing surface of the iron. It further has turned out that the airbag thereby may be compressed to a much smaller size than this would be possible using a conventional folding method.

The process of extracting the moisture from the airbag may be further accelerated and intensified by exposing the latter to dry compressed air and/or with a low pressure or even a vacuum. The effect of the dry compressed air is that the amount of air required for absorbing the moisture is available, while the low pressure or the vacuum allow or support the moisture to vaporize even at low temperatures. In the ideal case, the airbag is first exposed to the dry compressed air and is then exposed to the low pressure or the vacuum, whereby the moisture is extracted from the airbag within a very short period of time.

It is further proposed that the airbag is first folded to a size bigger than the target size intended for the same when being mounted in an airbag housing, and that the airbag, when being compressed, is compressed to a size equal to or smaller than the intended target size.

The moisture is introduced into the receptacle after or before the airbag has been folded, which airbag, at this time, is folded to a size bigger than the size intended for mounting. Afterwards, the airbag is compressed to the target size or to a size smaller than the target size. During the compressing operation, not only the shape is reduced, but in addition the moisture is pressed out of the airbag. The amount of moisture remaining to be extracted from the airbag after the final size has been reached thus is accordingly smaller. Furthermore, it is thus much easier to place the airbag in the airbag housing.

It is further proposed that the moisture is in vapor form enabling the moisture to permeate the airbag as thoroughly as possible, keeping the amount of moisture, which is introduced into the airbag and afterwards has to be extracted again, to a minimum.

Alternatively, the moisture can also be in liquid form, so that procedurally it is particularly easy to introduce the moisture into the airbag by pulling the airbag for example through a water bath.

Furthermore, the airbag itself may be compressed to a smaller size so that the airbag module may be designed to be smaller than with an airbag folded according to a conventional folding method. Furthermore, the airbag after having been compressed has a much better shape retention so that the pressure acting onto the cover of the airbag module as a result of a possible expansion of the airbag is much lower or is even not present at all. The probability of the burst line of the airbag module becoming visible is thus reduced. Moreover, this results in a much better handling of the airbag during the assembly of the airbag module and in reduced mounting forces at the assembly line. Moreover, no special additional devices are required in order to retain the airbag in the airbag module during the assembly of the latter. Furthermore, the side walls of the airbag module, in particular the side walls of the housing intended for mounting the airbag, may be designed to be lower, as the airbag owing to the improved shape retention even in this case cannot expand beyond the side walls. Furthermore, the improved shape retention of the airbag provides the advantage that the folding station may even be located outside the assembly line and may thus be used for several different airbag modules.

It is further proposed that no additional auxiliary means are provided for stabilizing the shape of the airbag. This is an advantage in so far as the unfolding process thus cannot be interrupted by the additional auxiliary means, and as the airbag module is generally more cost-effective to produce and to assemble.

For achieving the object, a device is further proposed which comprises openings in the walls of a receptacle provided for mounting the airbag during the folding process and/or in the slide tool, through which openings the airbag in the receptacle can be exposed to moisture. Owing to the openings, the airbag in the receptacle can be exposed to moisture and can be compressed at the same time so that both steps may be carried out in the same device. In particular the act of exposing to moisture may be carried out immediately prior to or even at the same time as the compression so that the time needed for compressing the airbag may be reduced. A further advantage is that the moisture thus cannot escape or cool down prior to the compression, and that the shape retaining effect of the airbag occurs to be highly effective after the compression.

Moreover, the receptacle can be exposed to a low pressure, preferably with a vacuum. Using the low pressure, the moisture is extracted from the airbag even faster by, on the one hand, the moisture being sucked out together with the air and, on the other hand, by the vaporization of possibly present residual moisture being supported by the low pressure.

It is further proposed that the receptacle can be exposed to dry compressed air so that the amount of air available for absorbing the moisture is increased.

Furthermore, the receptacle may be formed by an airbag container or a cover cap of an airbag container or of an airbag module so that the airbag, after having been folded and in addition given a stabilized shape, is already placed in a part allocated to the airbag module in an assembly-friendly manner.

In the following, the invention is described in more detail on the basis of a preferred embodiment.

DETAILED DESCRIPTION OF THE DRAWINGS

Figure 1:
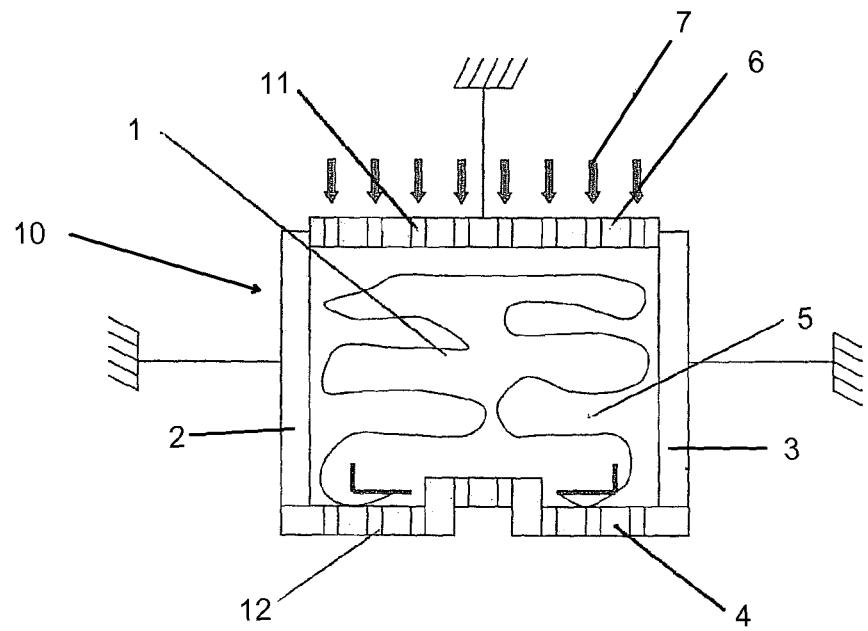
FIG. 1 shows a device comprising an airbag folded in a receptacle prior to the compression.

FIG. 1 shows a device 10 according to the invention comprising a receptacle 5 in which an airbag 1 is folded. The receptacle 5 is limited by the walls 2, 3, 4 and by a slide tool 6 displaceably guided between the walls 2 and 3. Respective openings 11 and 12 are provided in the wall 4 and in the slide tool 6. After the first step of folding the airbag 1 into the receptacle 5, in a second step the receptacle 5 with the airbag 1 located therein is now exposed to steam using a heated steam flow 7 through the openings 11.

Figure 2:
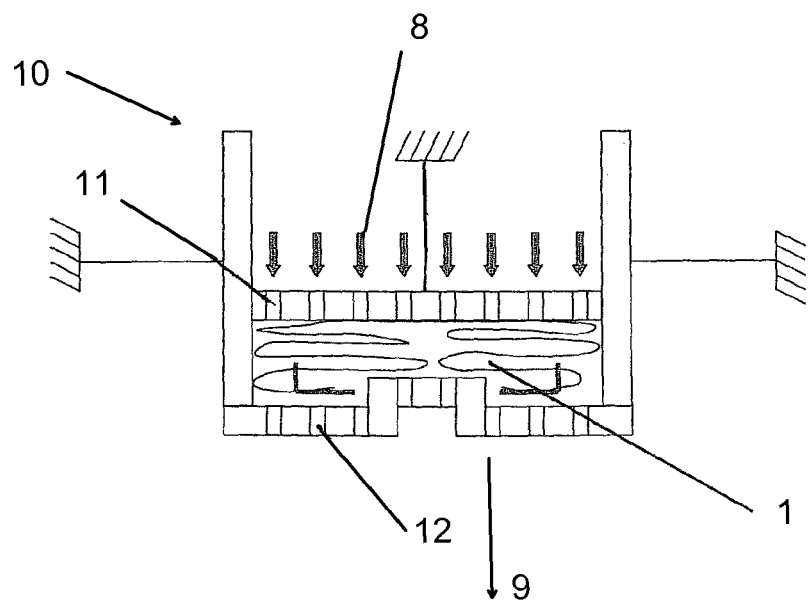
FIG. 2 shows a device comprising an airbag compressed in a receptacle.

The slide tool 6 is then displaced into the receptacle 5 to the position shown in FIG. 2, whereby the airbag 1 is compressed to a size smaller than or equal to the later target size. The moisture in the receptacle 5 and in the airbag 1 can escape through the openings 12 during the displacing process of the slide tool 6. The escape of the moisture is represented by the arrow direction 9. Afterwards, the receptacle 5 together with the compressed airbag 1 is exposed to dry compressed air in the arrow direction 8 for the complete extraction of the moisture. The dry compressed air has the function to absorb the moisture, wherein by the pressure of the air the corresponding amount of air is provided as well. In a next step the pressure in the receptacle 5 is abruptly lowered by the compressed air being sucked out, wherein the moisture is removed at the same time. The sucking process is symbolically represented by the arrow direction 9.

After the compressed air has been sucked out the airbag 1 is fully compressed to a size equal to or smaller than the target size intended for the same when being mounted in the airbag housing and is shape stabilized by use of the steam treatment according to the invention. The airbag 1 in this shape may be taken out of the receptacle 5 and will then no longer change its shape even over a longer period of time. Owing to the long-term shape retention, the airbag 1 in the compressed shape may even be stored temporarily or transported without automatically expanding again. Additional auxiliary means for fixing the shape are no longer necessary.

In addition, due to the moisture vaporizing abruptly that much evaporative cold may occur that the moisture inside the airbag 1 freezes and thereby additionally contributes to the shape retention.

Part of the moisture may also be absorbed by the airbag textile and remain there, as far as the saturation limit is not exceeded.

Alternatively, the moisture can also be introduced into the airbag 1 in liquid form by pulling the airbag 1 before being folded and compressed through a water bath or spraying the same with water from the outside. The airbag 1 in its wet state is then inserted into the device and subsequently is folded and compressed.

While the above description constitutes the preferred embodiment of the present invention, it will be appreciated that the invention is susceptible to modification, variation, and change without departing from the proper scope and fair meaning of the accompanying claims.

What is claimed is:

1. A method of preparing an airbag for placement in a vehicular airbag module, the method comprising the following steps:
   folding the airbag to a size larger than a target size;
   exposing the airbag to moisture; and
   simultaneously compressing the folded airbag to a size no larger than the target size and extracting moisture from the airbag so that the airbag obtains a self-contained and stable compressed shape wherein the target size is a size for a folded airbag intended to be mounted in an airbag housing.

2. The method according to claim 1, wherein step of extracting the moisture comprises the step of exposing the airbag to dry compressed air while compressing the airbag.

3. The method according to claim 1, wherein the step of extracting the moisture comprises the step of exposing the airbag to a vacuum while compressing the airbag.

4. The method according to claim 1, wherein the step of exposing the airbag to moisture is performed before folding the airbag.

5. The method according to claim 4, wherein the moisture is in vapor form.

6. The method according to claim 4, wherein the moisture is in liquid form.

7. A device for preparing an airbag for a vehicular airbag module, the device comprising:
   a receptacle for receiving the airbag, the receptacle having an open side and walls delimiting the receptacle;
   a slide tool configured to be inserted from the open side, to be movably guided in the receptacle, and to compress the airbag in the receptacle; and
   openings in at least one of the walls and the slide tool, the openings being configured for exposing the airbag located in the receptacle to moisture through the openings.

8. The device according to claim 7, further comprising that the receptacle is configured to be exposed to a vacuum.

9. The device according to claim 7 further comprising that the receptacle is configured to be exposed to dry compressed air.

10. The device according to claim 7, wherein the receptacle is formed by a portion of an airbag housing of the airbag module.

* * * * *